(12) United States Patent
Wu et al.

(10) Patent No.: US 9,426,741 B2
(45) Date of Patent: Aug. 23, 2016

(54) METHOD AND SYSTEM FOR CONTROLLING SIGNALLING TRANSMISSION IN POWER-SAVING MODE

(71) Applicant: ZTE Corporation, Shenzhen, Guangdong (CN)

(72) Inventors: Hao Wu, Shenzhen (CN); Fang Xie, Shenzhen (CN)

(73) Assignee: ZTE CORPORATION, Shenzhen, Guangdon (CN)

( * ) Notice: Subject to any disclaimer, the term of this patent is extended or adjusted under 35 U.S.C. 154(b) by 44 days.

(21) Appl. No.: 14/403,488

(22) PCT Filed: Apr. 24, 2013

(86) PCT No.: PCT/CN2013/074623
§ 371 (c)(1),
(2) Date: Nov. 24, 2014

(87) PCT Pub. No.: WO2013/177992
PCT Pub. Date: Dec. 5, 2013

(65) Prior Publication Data
US 2015/0139054 A1 May 21, 2015

(30) Foreign Application Priority Data
May 29, 2012 (CN) .......................... 2012 1 0171277

(51) Int. Cl.
*H04W 52/02* (2009.01)
*H04W 68/02* (2009.01)
(Continued)

(52) U.S. Cl.
CPC ......... *H04W 52/0225* (2013.01); *H04W 68/02* (2013.01); *H04W 8/20* (2013.01); *H04W 60/00* (2013.01); *Y02B 60/50* (2013.01)

(58) Field of Classification Search
CPC ..... H04W 52/02; H04W 8/20; H04W 36/24; H04W 92/02; H04W 28/0226; H04W 60/00; H04W 68/02; Y02B 60/50
See application file for complete search history.

(56) References Cited

U.S. PATENT DOCUMENTS 8,311,541 B2 * 11/2012 Yano ..................... H04W 36/12
370/311
8,655,359 B2 * 2/2014 Gotou ................. H04W 60/005
455/435.1

(Continued)

FOREIGN PATENT DOCUMENTS

CN 101247634 A 8/2008
CN 102111856 A 6/2011

(Continued)

OTHER PUBLICATIONS

Supplementary European Search Report in European application No. 13796719.6, mailed on Oct. 20, 2015.

(Continued)

*Primary Examiner* — Ahmed Elallam
(74) *Attorney, Agent, or Firm* — Oppedahl Patent Law Firm LLC (57) ABSTRACT

A method and system for controlling signalling transmission in a power-saving mode are disclosed. The method includes that a terminal transmits a tracking area update request signalling or a routing area update request signalling to a new mobility management unit, wherein each signalling includes a power-saving parameter; and the new mobility management unit transmits a power-saving parameter to an old mobility management unit or a serving gateway. According to the disclosure, a network is enabled to keep pace with the power-saving mode of the terminal, and a paging message is transmitted only at activation time, thereby ensuring that the terminal may receive the paging message, and avoiding resource waste caused by repeated paging of the network.

16 Claims, 4 Drawing Sheets

(51) Int. Cl.
*H04W 60/00* (2009.01)
*H04W 8/20* (2009.01)

(56) References Cited

U.S. PATENT DOCUMENTS

| | | | | |
|---|---|---|---|---|
| 8,755,334 B2* | 6/2014 | Ai | ................... | H04W 80/04 |
| | | | | 370/328 |
| 8,855,091 B2* | 10/2014 | Kim | ................. | H04W 52/0235 |
| | | | | 370/338 |
| 9,155,126 B2* | 10/2015 | Guo | ................... | H04W 8/02 |
| 2010/0064038 A1 | 3/2010 | Hu | | |
| 2010/0210275 A1 | 8/2010 | Navratil | | |
| 2010/0272069 A1 | 10/2010 | Hu | | |
| 2011/0045834 A1* | 2/2011 | Kim | ................ | H04L 45/306 |
| | | | | 455/438 |
| 2012/0115454 A1* | 5/2012 | Liao | ................... | H04W 60/02 |
| | | | | 455/418 |
| 2012/0157093 A1 | 6/2012 | Zhu | | |
| 2012/0214493 A1* | 8/2012 | Suh | ................ | H04W 36/0066 |
| | | | | 455/437 |
| 2012/0238236 A1* | 9/2012 | Liao | ................... | H04W 28/02 |
| | | | | 455/404.2 |
| 2013/0053031 A1* | 2/2013 | Widjaja | ............. | H04W 60/005 |
| | | | | 455/435.1 |
| 2013/0157661 A1* | 6/2013 | Bhaskaran | ........... | H04W 60/00 |
| | | | | 455/436 |
| 2013/0260811 A1* | 10/2013 | Rayavarapu | ........ | H04W 76/028 |
| | | | | 455/509 |
| 2013/0301499 A1* | 11/2013 | Jain | .................... | H04W 76/048 |
| | | | | 370/311 |
| 2014/0204931 A1* | 7/2014 | Jain | ................... | H04W 52/0277 |
| | | | | 370/338 |

FOREIGN PATENT DOCUMENTS

| | | |
|---|---|---|
| CN | 102450061 A | 5/2012 |
| EP | 2154859 A1 | 2/2010 |
| WO | 2011022896 A1 | 3/2011 |

OTHER PUBLICATIONS

Idle-mode Signalling Reduction (ISR), mailed on Aug. 2007.
Draft Procedures for ISR, mailed on Nov. 2007.
International Search Report in international application No. PCT/CN2013/074623, mailed on Jul. 25, 2013.
English Translation of the Written Opinion of the International Search Authority in international application No. PCT/CN2013/074623, mailed on Jul. 25, 2013.

\* cited by examiner

METHOD AND SYSTEM FOR CONTROLLING SIGNALLING TRANSMISSION IN POWER-SAVING MODE

TECHNICAL FIELD

The disclosure relates to the field of Machine Type Communication (MTC), and in particular to a method and system for controlling signalling transmission in a power-saving mode.

BACKGROUND

Figure 1:
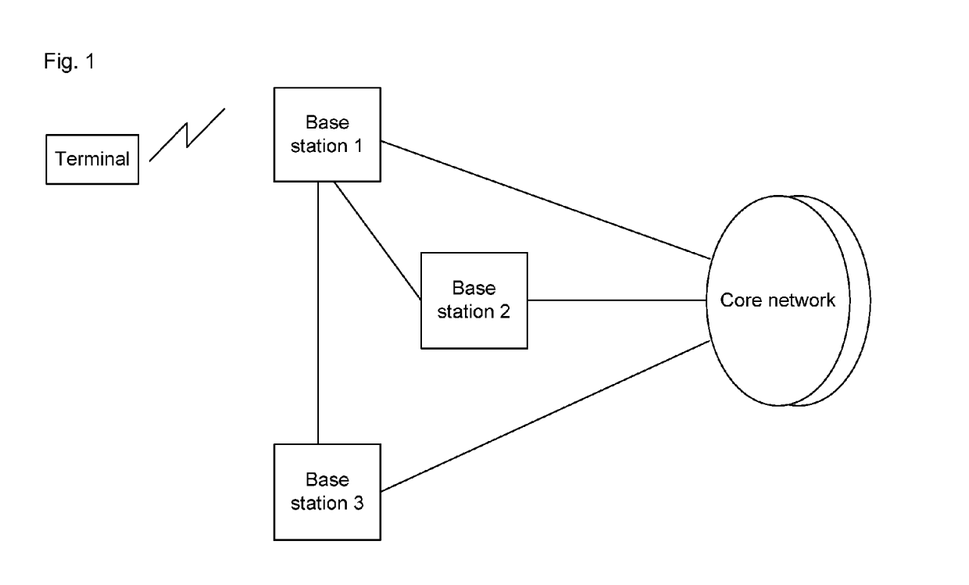
FIG. 1 is a structural diagram of a cellular wireless communication system in the prior art.

The existing cellular wireless communication system, as shown in FIG. 1, is mainly composed of a Core Network (CN), a Radio Access Network (RAN) and a terminal. The CN is responsible for non-access stratum events, for example terminal position update or the like. The CN is an anchor point of a user plane. The RAN includes a base station, or includes a base station and a base station controller, and is responsible for access stratum events, for example radio resource management. The base stations may be connected physically or logically according to the actual situations, for example the connection between base station 1 and base station 2, or the connection between the base station 1 and base station 3, and each base station may be connected with one or more CN nodes. The terminal, i.e., User Equipment (UE), refers to any device which may be communicated with a cellular wireless communication network, such as a mobile phone or a laptop.

A mobility management unit refers to a Mobility Management Entity (MME) in a Long Term Evolution (LTE) network, or refers to a Serving General Packet Radio Service (GPRS) Support Node (SGSN) in a $3^{rd}$ Generation (3G) mobile communication network. The MME or the SGSN is a unit responsible for managing terminal access control, location information update and switching in the CN, and responsible for non-access stratum signalling control from the CN to a terminal, as well as has the function of registering the terminal with the network.

Home Subscriber Server (HSS) or Home Location Register (HLR) is an entity in the CN, which is responsible for saving subscription data, identity information, authentication information, authorization information or the like of a terminal. According to different situations, the HSS or the HLR may be configured to save the identity information of a user and the binding information of the user and a terminal device, or only save the identity information of the user (the binding information of the user and the terminal device may be saved by a gateway), or directly save the identity information of the terminal device. The HSS or HLR is also responsible for a subscription database of the user, and performs authentication and authorization for the user. A service platform may make a query to the HSS or the HLR to get user information or terminal information.

In the early time of deployment of LTE, it is impossible to replace all the original 3G networks, which may result in a terminal moving to and fro between the LTE network and the 3G network, thereby resulting in repeated Tracking Area Update (TAU) or Routing Area Update (RAU). The TAU is performed when the terminal moves to the LTE network, and the RAU is performed when the terminal moves to the 3G network. This will cause great signalling consumption. Therefore, an LTE terminal needs to avoid a large number of signalling interactions with the network in an idle state through an Idle state Signalling Reduction (ISR) mode. In the ISR mode, the terminal is registered with the MME and the SGSN simultaneously, in this way, the terminal does not need to perform TAU or RAU when moving between the LTE network and the 3G network (that is, moving between the MME and the SGSN). When data arrives at a Serving Gateway (SGW), the SGW needs to transmit downlink data notification messages to both the MME and the SGSN, so that both of the MME and the SGSN need to transmit paging messages to the terminal.

In a practical application, some terminals do not need to communicate with the network from time to time, for example a location reporting terminal on an express vehicle which reports the current location of the vehicle only when arriving at a certain specified place or according to a specified cycle. Therefore, this type of terminal may use a power saving mode, and set sleep time in the power saving mode. The terminal does not receive any paging message or communicate with the network within the sleep time in the power saving mode, and receives and transmits the data only at the activation time. When entering the power saving mode, the terminal may not receive the paging message, but the network will transmit a paging message when downlink data arrives; at this time, not only the terminal is unable to receive the paging message, but also unnecessary resource waste is caused by repeated paging from the network.

SUMMARY

In view of this, the embodiments of the disclosure are intended to provide a method and system for controlling signalling transmission in a power-saving mode, by which the problem in the prior art that the terminal is unable to receive a paging message from the network and resource waste is caused by repeated paging of the network is solved.

To this end, the technical solutions of the embodiments of the disclosure are implemented as follows.

The embodiments of the disclosure provide a method for controlling signalling transmission in a power-saving mode, including that:

a terminal transmits a TAU request signalling or an RAU request signalling to a new mobility management unit, wherein each signalling includes a power-saving parameter; and the new mobility management unit transmits the power-saving parameter to an old mobility management unit or an SGW.

Preferably, that the new mobility management unit transmits the power-saving parameter to the old mobility management unit includes that:

the new mobility management unit transmits a context request signalling to the old mobility management unit;

the old mobility management unit transmits a context response signalling to the new mobility management unit, wherein the context response signalling includes an ISR mode supported indication; and the new mobility management unit transmits a context confirmation signalling to the old mobility management unit, wherein the context confirmation signalling includes an ISR activation indication and the power-saving parameter.

Preferably, after the new mobility management unit transmits the power-saving parameter to the old mobility management unit, the method further includes that:

when the SGW transmits a notification signalling to the new mobility management unit and the old mobility management unit, the new mobility management unit and the old mobility management unit, according to the power-saving parameter of the terminal, determine that:

the new mobility management unit and the old mobility management unit transmit a paging message to the terminal if current time is within the activation time of the terminal; and the new mobility management unit and the old mobility management unit transmit a feedback signalling to the SGW if current time is within the non-activation time of the terminal, wherein the feedback signalling includes a delay indication.

Preferably, that the new mobility management unit transmits the power-saving parameter to the SGW includes that:

the new mobility management unit transmits a bearer update request signalling to the SGW, wherein the bearer update request signalling includes the power-saving parameter.

Preferably, after the new mobility management unit transmits the power-saving parameter to the SGW, the method further includes that: the SGW, according to the power-saving parameter, controls signalling transmission:

when there is data needed to be transmitted to the terminal, the SGW transmits a downlink data notification signalling to the new mobility management unit if current time is within the activation time of the terminal; the SGW buffers the data of the terminal if current time is within the non-activation time of the terminal, and does not transmit a downlink data notification signalling to the new mobility management unit until the activation time of the terminal comes.

Preferably, the power-saving parameter includes the activation time and a power-saving mode cycle, or includes the activation time and sleep time.

The embodiments of the disclosure also provide a system for controlling signalling transmission in a power-saving mode, including a terminal, a new mobility management unit, an old mobility management unit and a SGW, wherein the terminal is configured to transmit a TAU request signalling or an RAU request signalling to the new mobility management unit, wherein each signalling includes a power-saving parameter;

the new mobility management unit is configured to transmit the power-saving parameter to the old mobility management unit or the SGW; and the old mobility management unit and the SGW save the received power-saving parameter.

Preferably, the new mobility management unit is also configured to transmit a context request signalling to the old mobility management unit;

the old mobility management unit is also configured to transmit a context response signalling to the new mobility management unit, wherein the context response signalling includes an ISR mode supported indication; and the new mobility management unit is also configured to transmit a context confirmation signalling to the old mobility management unit, wherein the context confirmation signalling includes an ISR activation indication and the power-saving parameter.

Preferably, after the new mobility management unit transmits the power-saving parameter to the old mobility management unit, the new and old mobility management units are also configured to, when the SGW transmits notification signalling to the new mobility management unit and the old mobility management unit, determine, according to the power-saving parameter of the terminal, that:

the new mobility management unit and the old mobility management unit transmit a paging message to the terminal if current time is within the activation time of the terminal; and the new mobility management unit and the old mobility management unit transmit a feedback signalling to the SGW if current time is within the non-activation time of the terminal, wherein the feedback signalling includes a delay indication.

Preferably, the new mobility management unit is also configured to transmit a bearer update request signalling to the SGW, wherein the bearer update request signalling includes the power-saving parameter.

Preferably, after the new mobility management unit transmits the power-saving parameter to the SGW, the SGW is also configured to control signalling transmission according to the power-saving parameter:

when there is data needed to be transmitted to the terminal, the SGW transmits a downlink data notification signalling to the new mobility management unit if current time is within the activation time of the terminal; the SGW buffers the data of the terminal if current time is within the non-activation time of the terminal, and does not transmit a downlink data notification signalling to the new mobility management unit until the activation time of the terminal comes.

Preferably, the power-saving parameter includes the activation time and a power-saving mode cycle, or includes the activation time and sleep time.

When the method and system for controlling signalling transmission in a power-saving mode provided by the embodiments of the disclosure are applied to the terminal moving between the 3G network and the LTE network, the new and old mobility management units save the power-saving parameter of the terminal, and control the timing at which a paging message is transmitted to the terminal according to the power-saving parameter. When applied to the terminal moving across a tracking area within the LTE network, the SGW saves the power-saving parameter of the terminal, and controls the timing at which a downlink data notification signalling is transmitted to a new MME according to the power-saving parameter.

According to the embodiments of the disclosure, the network is enabled to keep pace with the power-saving mode of a terminal, and a paging message is transmitted only at activation time, thereby ensuring that the terminal may receive a paging message, and avoiding resource waste caused by repeated paging of the network.

DETAILED DESCRIPTION

The technical solutions of the disclosure will be further explained below in detail in conjunction with the accompanying drawings and the specific embodiments.

In view that in the prior art when a terminal enters a power-saving mode, the terminal may not receive a paging message, but a network will initiate paging to the terminal when downlink data arrives, therefore, not only the terminal is unable to receive the paging message, but also unnecessary resource waste is caused by repeated paging from the network. The embodiments of the disclosure provide a method and system for controlling signalling transmission in a power-saving mode, which will be described in detail below in conjunction with the specific embodiments.

Figure 2:
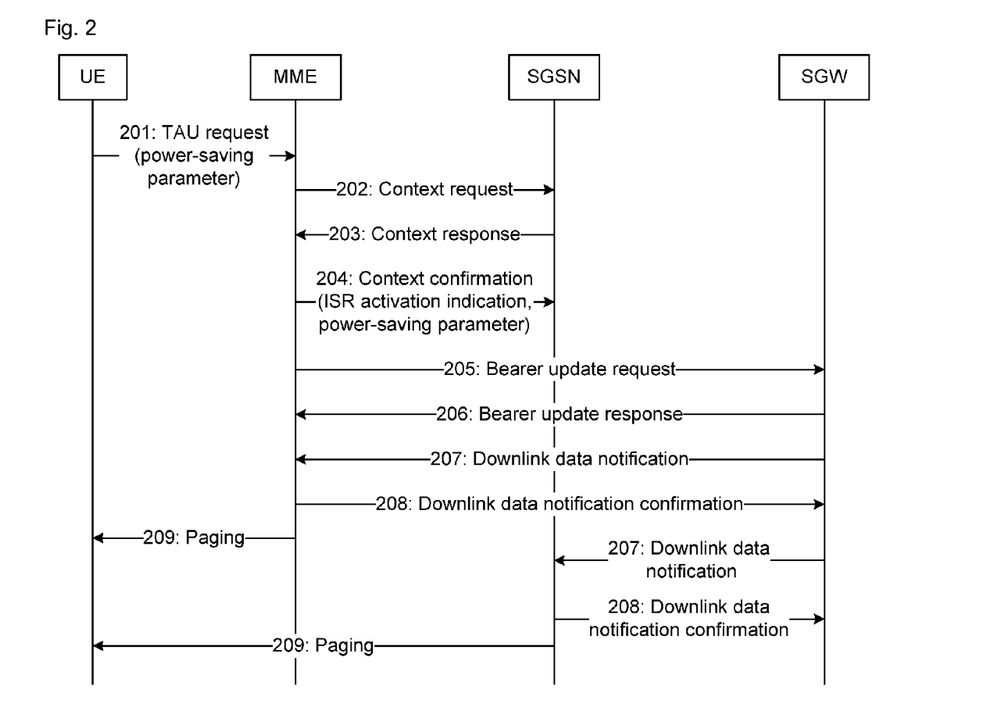
FIG. 2 is a flowchart of a method for controlling signalling transmission in a power-saving mode according to embodiment I of the disclosure.

The method for controlling signalling transmission in a power-saving mode according to embodiment I of the disclosure is adopted to a terminal which moves between a 3G network and an LTE network. The flow of the method is as shown in FIG. 2, mainly including the following steps.

Step 201: When a terminal residing in a 3G network moves to an LTE network, a serving node of the terminal is changed from an SGSN (i.e., an old mobility management unit) to an MME (i.e., a new mobility management unit). The terminal transmits a TAU request signalling to the MME. The signalling includes an identifier of the terminal, such as an International Mobile Subscriber Identification Number (IMSI) or Globally Unique Temporary ID (GUTI) of the terminal, and the signalling also includes a power-saving parameter and an identifier of the SGSN.

A component form of the power-saving parameter may be as follows:

I. the power-saving parameter includes activation time, sleep time; or

II. the power-saving parameter includes activation time, power-saving mode cycle.

The activation time represents the time within which the terminal may receive data and signalling. The sleep time represents the time within which the terminal may not receive data or signalling. The power-saving mode cycle represents the time length between two activations of the terminal. Both of the activation time and the sleep time are a period of time.

It should be noted that, in the embodiment of the disclosure, the component form of the power-saving parameter is not merely limited to the above two, the power-saving parameter may only include the activation time, or may also only include the sleep time and the power-saving mode cycle (the activation time may be obtained by subtracting the sleep time from the power-saving mode cycle). In the practical application, any component form of the power-saving parameter which may indicate the time when the terminal may receive the data and signalling should fall within the scope of protection of claims of the embodiments of the disclosure.

Step 202: The MME transmits a context request signalling to a corresponding SGSN according to an SGSN address in the TAU request; the signalling includes the identifier of the terminal.

Step 203: The SGSN performs a query to get context information corresponding to the terminal according to the identifier of the terminal in the context request signalling. The context information includes a bearer identifier of the terminal, a security authentication parameter, an SGW name, an SGW address and an ISR supported indication. The SGSN transmits the context information of the terminal to the MME by including the context information in a context response signalling.

The ISR supported indication is set as follows:

one identifier "Idle mode Signalling Reduction Supported Indication" is used, if the value thereof is set to be 1, it represents that the SGSN and the SGW have the ISR capability, and if the value thereof is set to be 0, it represents that the SGSN or the SGW has no ISR capability.

Step 204: The MME transmits a context confirmation signalling to the SGSN after receiving the context information. If the context information includes the ISR supported indication, and if "Idle mode Signalling Reduction Supported Indication" is set to be 1, then the MME activates the ISR mode, and the context confirmation signalling is made to include the ISR activation indication and the power-saving parameter, wherein the ISR activation indication is set to be 1, representing that the MME has activated the ISR mode.

If "Idle mode Signalling Reduction Supported Indication" is set to be 0, or the MME does not activate the ISR mode, then the ISR activation indication in the context confirmation signalling from the MME is set to be 0, representing that the MME does not activate the ISR mode and the context confirmation signalling does not include the power-saving parameter.

The SGSN continues keeping the context information of the terminal, and saves the power-saving parameter transmitted by the MME. If the ISR activation indication in the context confirmation signalling from the MME is set to be 1, then the SGSN itself also activates the ISR mode.

The MME and the SGSN locally set and start a power-saving mode timer according to the power-saving parameter:

if the power-saving parameter includes the activation time and the sleep time, then one activation timer is started, the value of which is set to be the activation time in the power-saving parameter; a sleep timer is started after the activation timer times out, the value of which is set to be the sleep time in the power-saving parameter; the activation timer will be started again after the sleep timer times out; and if the power-saving parameter includes the activation time and the power-saving mode cycle, then one activation timer is started, the value of which is set to be the activation time in the power-saving parameter, and a power-saving mode cycle timer is started, the value of which is set to be the power-saving mode cycle in the power-saving parameter, and the power-saving mode cycle timer is started in a circular manner; and the activation timer will be started again after each cycle of the power-saving mode cycle timer times out.

Step 205: The MME transmits a bearer update request signalling to the corresponding SGW according to the SGW address in the context information.

Step 206: The SGW transmits a bearer update response signalling to the MME by including the MME address in the local bearer context information after receiving the bearer update request signalling transmitted by the MME.

Step 207: When there is data transmitted to the terminal, the SGW transmits a downlink data notification signalling to the MME and the SGSN. The downlink data notification signalling includes the identifier of the terminal.

After the ISR mode is activated, the terminal does not need to make a location update request when moving between the MME and the SGSN, therefore, the SGW cannot determine the terminal is currently in the service scope of the SGSN or the MME, thereby needing to transmit the downlink data notification signalling to the MME and the SGSN.

Steps 208-209: The MME and the SGSN look up the locally saved power-saving parameter corresponding to the terminal according to the identifier of the terminal in the downlink data notification signalling, and make the following judgment:

if within the activation time of the terminal currently, that is, the activation timer has been started, then the MME and the SGSN transmit a downlink data notification confirmation signalling to the SGW, the signalling indicates that a paging message will be transmitted immediately; the MME and the SGSN transmit the paging message to the terminal; and if within the sleep time of the terminal currently, that is, the activation timer has not been started or the sleep timer has been started, then the MME and the SGSN transmit a downlink data notification confirmation signalling to the SGW, the signalling includes the identifier of the terminal and a delay indication.

The value of the delay indication may be set to be slightly greater than the time length from the current time to the activation time of next cycle, for example, the value of the delay indication=the time length (i.e., the time length from the current time to the activation time of next cycle)+4 minutes, wherein the time length from the current time to activation time of next cycle is obtained as follows:

if the MME or the SGSN operates one power-saving mode cycle timer, then the time length may be set to be the remaining time of the power-saving mode cycle timer; and if the MME or the SGSN operates one sleep timer, then the time length may be set to be the remaining time of the sleep timer.

The SGW, after receiving the downlink data notification confirmation signalling, does not transmit the downlink data notification signalling within the time any longer according to the value of the delay indication in the signalling, and buffers the data of the terminal. Correspondingly, the MME and the SGSN do not transmit the paging message to the terminal immediately, but transmit the paging message to the terminal when the activation time of the terminal arrives.

It should be noted that, since both of the MME and the SGSN save the context information of the terminal, the two network elements both will think that the terminal is in their own networks, and the two networks will try to transmit the paging message. Once one network element receives a response to the paging (transmits a service request) from the terminal, the network element then reports to the SGW, and the SGW notifies the other network element to stop paging.

The terminal, after receiving the paging message, transmits a service request to the MME or the SGSN which transmitted the paging message.

The MME or the SGSN receiving the service request transmits a context establishment request signalling to a base station, and the request signalling includes the SGW address. The base station, after receiving the request signalling, establishes a radio bearer for the terminal, and after establishment, transmits a context establishment finish signalling to the MME or the SGSN. The MME or the SGSN transmits the address of the base station to the SGW, the SGW transmits the downlink data to the base station, and the base station transmits the downlink data to the terminal.

Figure 3:
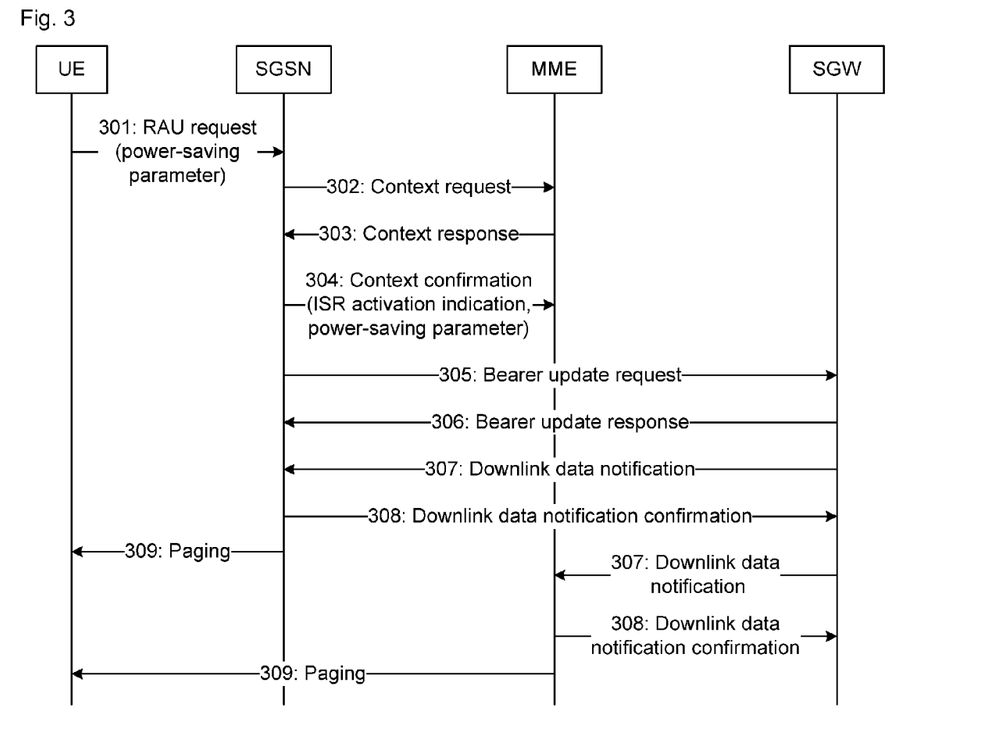
FIG. 3 is a flowchart of a method for controlling signalling transmission in a power-saving mode according to embodiment II of the disclosure.

The method for controlling signalling transmission in a power-saving mode according to embodiment II of the disclosure is adopted to the terminal which moves between a 3G network and an LTE network. The flow of the method is as shown in FIG. 3, mainly including the following steps.

Step 301: When a terminal residing in an LTE network moves to a 3G network, a serving node of the terminal is changed from an MME (i.e., an old mobility management unit) to an SGSN (i.e., a new mobility management unit). The terminal transmits an RAU request signalling to the SGSN. The signalling includes an identifier of the terminal (IMSI or GUTI), an identifier of the MME and a power-saving parameter.

A component form of the power-saving parameter may be as follows:

I. the power-saving parameter includes activation time, sleep time; or

II. the power-saving parameter includes activation time, power-saving mode cycle.

The activation time represents the time within which the terminal may receive data and signalling. The sleep time represents the time within which the terminal may not receive data or signalling. The power-saving mode cycle represents the time length between two activations of the terminal. Both of the activation time and the sleep time are a period of time.

It should be noted that, in the embodiment of the disclosure, the component form of the power-saving parameter is not merely limited to the above forms, the power-saving parameter may only include the activation time, or may also only include the sleep time and the power-saving mode cycle (the activation time may be obtained by subtracting the sleep time from the power-saving mode cycle). In the practical application, any component form of the power-saving parameter which may indicate the time when the terminal may receive the data and signalling should fall within the scope of protection of claims of the embodiments of the disclosure.

Step 302: The SGSN transmits a context request signalling to the MME according to an MME address in the RAU request. The signalling includes the identifier of the terminal.

Step 303: The MME performs a query to get context information corresponding to the terminal according to the identifier of the terminal in the context request signalling. The context information includes a bearer identifier of the terminal, a security authentication parameter, an SGW name, an SGW address and an ISR supported indication. The MME transmits the context information of the terminal to the SGSN by including the context information in a context response signalling.

The ISR supported indication is set as follows:

one identifier "Idle mode Signalling Reduction Supported Indication" is used, if the value thereof is set to be 1, it represents that the MME and the SGW have the ISR capability, and if the value thereof is set to be 0, it represents that the MME or the SGW has no ISR capability.

Step 304: The SGSN transmits a context confirmation signalling to the MME after receiving the context information. If the context information includes the ISR supported indication, and if "Idle mode Signalling Reduction Supported Indication" is set to be 1, the SGSN activates the ISR mode, and the context confirmation signalling includes the ISR activation indication and the power-saving parameter, wherein the ISR activation indication is set to be 1, representing that the SGSN has activated the ISR mode.

If "Idle mode Signalling Reduction Supported Indication" is set to be 0, or the SGSN does not activate the ISR mode, the ISR activation indication in the context confirmation signalling from the SGSN is set to be 0, representing that the SGSN does not activate the ISR mode and the context confirmation signalling does not include the power-saving parameter.

The MME continues keeping the context information of the terminal, and saves the power-saving parameter transmitted by the SGSN. If the ISR activation indication in the context confirmation signalling from the SGSN is set to be 1, the MME itself also activates the ISR mode.

The MME and the SGSN locally set and start a power-saving mode timer according to the power-saving parameter:

if the power-saving parameter includes the activation time and the sleep time, one activation timer is started, the value of which is set to be the activation time in the power-saving parameter; a sleep timer is started after the activation timer times out, the value of which is set to be the sleep time in the power-saving parameter; the activation timer will be started again after the sleep timer times out; and if the power-saving parameter includes the activation time and the power-saving mode cycle, then one activation timer is started, the value of which is set to be the activation time in the power-saving parameter, and a power-saving mode cycle timer is started, the value of which is set to be the power-saving mode cycle in the power-saving parameter, and the power-saving mode cycle timer is started in a circular manner; and the activation timer will be started again after each cycle of the power-saving mode cycle timer times out.

Step 305: The SGSN transmits a bearer update request signalling to the corresponding SGW according to the SGW address in the context information.

Step 306: The SGW transmits a bearer update response signalling to the SGSN by including the SGSN address in the local bearer context information after receiving the bearer update request signalling transmitted by the SGSN.

Step 307: When there is data transmitted to the terminal, the SGW transmits a downlink data notification signalling to the MME and the SGSN. The downlink data notification signalling includes the identifier of the terminal.

After the ISR mode is activated, the terminal does not need to make a location update request when moving between the MME and the SGSN, therefore, the SGW cannot determine the terminal is currently in the service scope of the SGSN or the MME, thereby needing to transmit the downlink data notification signalling to the MME and the SGSN.

Steps 308-309: The MME and the SGSN look up the locally saved power-saving parameter corresponding to the terminal according to the identifier of the terminal in the downlink data notification signalling, and make the following judgment:

if within the activation time of the terminal, that is, the activation timer has been started, then the MME and the SGSN transmit a downlink data notification confirmation signalling to the SGW, the signalling indicates that a paging message will be transmitted immediately; the MME and the SGSN transmits the paging message to the terminal; and if within the sleep time of the terminal, that is, the activation timer has not been started or the sleep timer has been started, then the MME and the SGSN transmit a downlink data notification confirmation signalling to the SGW, the signalling includes the identifier of the terminal and a delay indication.

The value of the delay indication may be set to be slightly greater than the time length from the current time to the activation time of next cycle, for example, the value of the delay indication=the time length (i.e., the time length from the current time to the activation time of next cycle)+4 minutes, wherein the time length from the current time to the activation time of next cycle is obtained as follows:

if the MME or the SGSN operates one power-saving mode cycle timer, the time length may be set to be the remaining time of the power-saving mode cycle timer; and if the MME or the SGSN operates one sleep timer, the time length may be set to be the remaining time of the sleep timer.

The SGW, after receiving the downlink data notification confirmation signalling, does not transmit the downlink data notification signalling within the time any longer according to the value of the delay indication in the signalling, and buffers the data of the terminal. Correspondingly, the MME and the SGSN do not transmit the paging message to the terminal immediately, but transmit the paging message to the terminal when the activation time of the terminal arrives.

It should be noted that, since both of the MME and the SGSN save the context information of the terminal, the two network elements both will think that the terminal is in their own networks, and the two networks will try to transmit the paging message. Once one network element receives a response to the paging (transmits a service request) from the terminal, the network element then reports to the SGW, and the SGW notifies the other network element to stop paging.

The terminal, after receiving the paging message, transmits a service request to the MME or the SGSN which transmitted the paging message.

The MME or the SGSN receiving the service request transmits a context establishment request signalling to a base station, and the request signalling includes the SGW address. The base station, after receiving the signalling, establishes a radio bearer for the terminal, and after establishment, transmits a context establishment finish signalling to the MME or the SGSN. The MME or the SGSN transmits the address of the base station to the SGW, the SGW transmits the downlink data to the base station, and the base station transmits the downlink data to the terminal.

Figure 4:
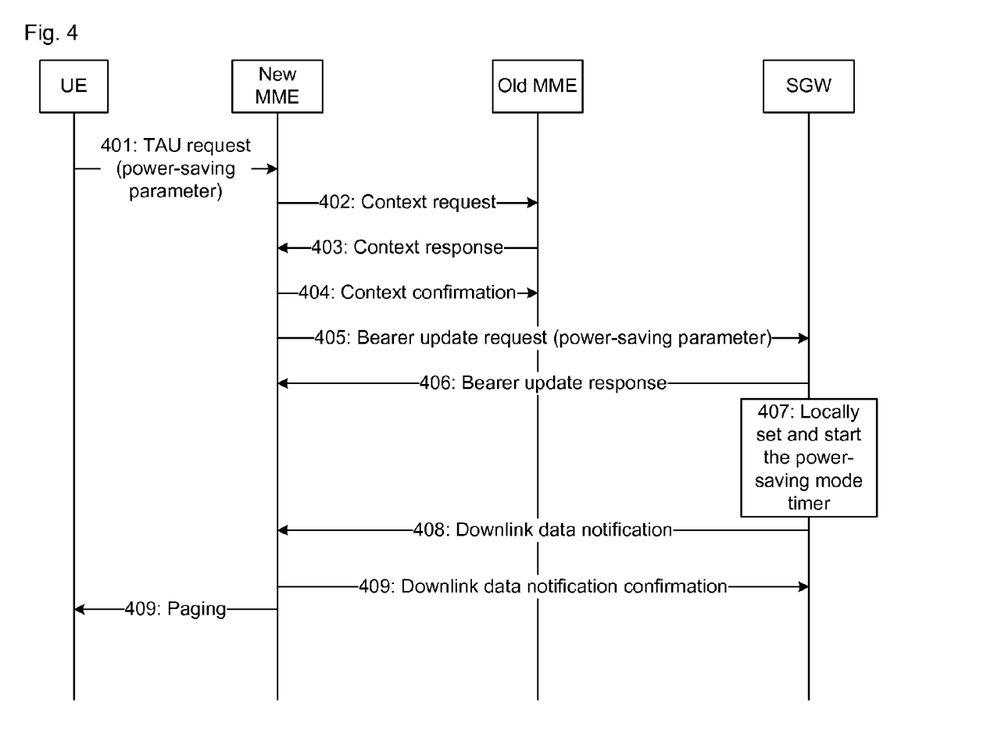
FIG. 4 is a flowchart of a method for controlling signalling transmission in a power-saving mode according to embodiment III of the disclosure.

The method for controlling signalling transmission in a power-saving mode according to embodiment III of the disclosure is adopted to the terminal which moves across a tracking area within an LTE network. The flow of the method is as shown in FIG. 4, mainly including the following steps.

Step 401: The tracking area is an area divided by a network to manage the location where the terminal is located. The terminal is allocated to one tracking area after the terminal is registered with the network. The terminal may move to a new tracking area during moving.

When the terminal moves to a new tracking area, the terminal transmits a TAU request signalling to an MME of the new tracking area, and the signalling includes a power-saving parameter.

A component form of the power-saving parameter may be as follows:

I. the power-saving parameter includes activation time, sleep time; or

II. the power-saving parameter includes activation time, power-saving mode cycle.

The activation time represents the time within which the terminal may receive data and signalling. The sleep time represents the time within which the terminal may not receive data or signalling. The power-saving mode cycle represents the time length between two activations of the terminal. Both of the activation time and the sleep time are a period of time.

It should be noted that, in the embodiment of the disclosure, the component form of the power-saving parameter is not merely limited to the above forms, the power-saving parameter may only include the activation time, or may also only include the sleep time and the power-saving mode cycle (the activation time may be obtained by subtracting the sleep time from the power-saving mode cycle). In the practical application, any component form of the power-saving parameter which may indicate the time when the terminal may receive the data and signalling should fall within the scope of protection of claims of the embodiments of the disclosure.

Step 402: The new MME transmits a context request signalling to the old MME according to the address of the old MME in the TAU request. The signalling includes an identifier of the terminal (IMSI or GUTI).

Step 403: The old MME performs a query to get context information of the terminal according to the identifier of the terminal transmitted by the new MME. The context information includes a bearer identifier of the terminal, a security authentication parameter, an SGW name and an SGW address. The old MME transmits the context information of the terminal to the new MME by including the context information of the terminal in a context response signalling.

Step 404: The new MME transmits a context confirmation signalling to the old MME after receiving the context information.

Step 405: The new MME transmits a bearer update request signalling to the corresponding SGW according to the SGW address in the context information.

Step 406: The SGW transmits a bearer update response signalling to the new MME after saving the received power-saving parameter and saving the identifier or address of the new MME.

Step 407: The SGW locally sets and starts a power-saving mode timer according to the power-saving parameter:

if the power-saving parameter includes the activation time and the sleep time, then one activation timer is started, the value of which is set to be the activation time in the power-saving parameter; after the activation timer times out, the sleep timer is started, the value of which is set to be the sleep time in the power-saving parameter; the activation timer will be started again after the sleep timer times out; and if the power-saving parameter includes the activation time and the power-saving mode cycle, then one activation timer is started, the value of which is set to be the activation time in the power-saving parameter, and one power-saving mode cycle timer is started, the value of which is set to be the power-saving mode cycle in the power-saving parameter, and the power-saving mode cycle timer is started in a circular manner; and the activation timer will be started again after each cycle of the power-saving mode cycle timer times out.

Steps 408-409: When there is data transmitted to the terminal, the SGW, according to each power-saving mode timer, makes the following judgment:

if within the activation time of the terminal, that is, the activation timer has been started, then the SGW transmits a downlink data notification signalling to the new MME; and if within the sleep time of the terminal currently, that is, the activation timer has not been started or the sleep timer has been started, then the SGW buffers the data of the terminal, and does not transmit a downlink data notification signalling to the new MME until the activation timer is started.

The new MME, after receiving the downlink data notification signalling transmitted by the SGW, transmits a downlink data notification confirmation signalling to the SGW, and then confirms reception of the signalling. The signalling indicates that a paging message will be transmitted immediately. The new MME transmits the paging message to the terminal.

The terminal, after receiving the paging message, transmits a service request to the new MME.

The new MME transmits a context establishment request to a base station, and the request signalling includes the SGW address. The base station, after receiving the signalling, establishes a radio bearer for the terminal, and after establishment, transmits a context establishment finish signalling to the MME. The MME transmits the address of the base station to the SGW, the SGW transmits the downlink data to the base station, and the base station transmits the downlink data to the terminal.

Figure 5:
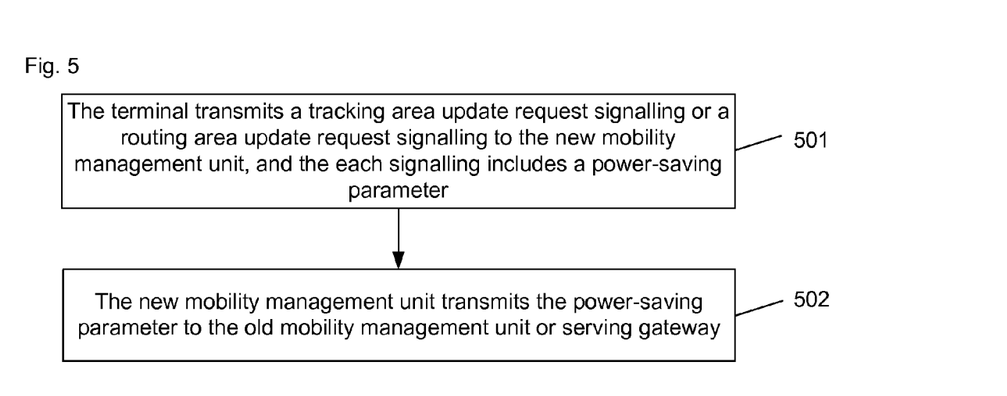
FIG. 5 is a flowchart of a method for controlling signalling transmission in a power-saving mode according to an embodiment of the disclosure.

To sum up, the embodiments of the disclosure provide a method for controlling signalling transmission in a power-saving mode, as shown in FIG. 5, mainly including that:

Step 501: a terminal transmits a TAU request signalling or an RAU request signalling to a new mobility management unit, and the TAU request signalling and the RAU request signalling each includes a power-saving parameter; and Step 502: the new mobility management unit transmits the power-saving parameter to an old mobility management unit or a SGW.

Preferably, the new mobility management unit transmitting the power-saving parameter to the old mobility management unit includes that:

the new mobility management unit transmits a context request signalling to the old mobility management unit;

the old mobility management unit transmits a context response signalling to the new mobility management unit, wherein the context response signalling includes an ISR mode supported indication; and the new mobility management unit transmits a context confirmation signalling to the old mobility management unit, wherein the context confirmation signalling includes an ISR activation indication and the power-saving parameter.

Correspondingly, after the new mobility management unit transmits the power-saving parameter to the old mobility management unit, the method further includes that:

when the SGW transmits a notification signalling to the new mobility management unit and the old mobility management unit, the new mobility management unit and the old mobility management unit, according to the power-saving parameter of the terminal, determine that:

the new mobility management unit and the old mobility management unit transmit a paging message to the terminal if the current time is within the activation time of the terminal; and the new mobility management unit and the old mobility management unit transmit a feedback signalling to the SGW if the current time is within the non-activation time of the terminal, wherein the feedback signalling includes a delay indication.

Preferably, the new mobility management unit transmitting the power-saving parameter to the SGW includes that: the new mobility management unit transmits a bearer update request signalling to the SGW, wherein the bearer update request signalling includes the power-saving parameter.

Correspondingly, after the new mobility management unit transmits the power-saving parameter to the SGW, the method further includes that the SGW, according to the power-saving parameter, controls the signalling transmission:

when there is data needed to be transmitted to the terminal, the SGW transmits a downlink data notification signalling to the new mobility management unit if within the activation time of the terminal currently; the SGW buffers the data of the terminal if within the non-activation time of the terminal currently, and does not transmit the downlink data notification signalling to the new mobility management unit until the activation time of the terminal comes.

Figure 6:
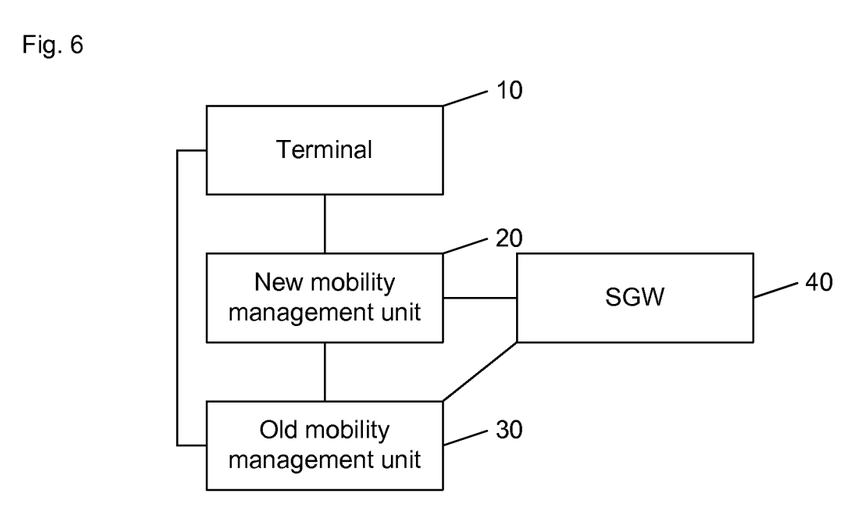
FIG. 6 is a structural diagram of a system for controlling signalling transmission in a power-saving mode according to an embodiment of the disclosure.

An embodiment of the disclosure provides a system for controlling signalling transmission in a power-saving mode corresponding to the methods of the above embodiments. As shown in FIG. 6, the system includes a terminal 10, a new mobility management unit 20, an old mobility management unit 30 and an SGW 40, wherein the terminal 10 is configured to transmit a TAU request signalling or an RAU request signalling to the new mobility management unit 20, wherein each signalling includes a power-saving parameter;

the new mobility management unit 20 is configured to transmit the power-saving parameter to the old mobility management unit 30 or the SGW 40; and the old mobility management unit 30 and the SGW 40 save the received power-saving parameter.

Preferably, the new mobility management unit 20 is further configured to transmit a context request signalling to the old mobility management unit 30;

the old mobility management unit 30 is further configured to transmit a context response signalling to the new mobility management unit 20, wherein the context response signalling includes an ISR mode supported indication; and the new mobility management unit 20 is further configured to transmit a context confirmation signalling to the old mobility management unit 30, wherein the context confirmation signalling includes an ISR activation indication and the power-saving parameter.

Preferably, after the new mobility management unit 20 transmits the power-saving parameter to the old mobility management unit 30, the new and old mobility management units are further configured to, when the SGW 40 transmits a notification signalling to the new mobility management unit 20 and the old mobility management unit 30, determine, according to the power-saving parameter of the terminal, that:

the new mobility management unit 20 and the old mobility management unit 30 transmit a paging message to the terminal 10 if the current time is within the activation time of the terminal; and the new mobility management unit 20 and the old mobility management unit 30 transmit a feedback signalling to the SGW 40 if the current time is within the non-activation time of the terminal, wherein the feedback signalling includes a delay indication.

Preferably, the new mobility management unit 20 is further configured to transmit a bearer update request signalling to the SGW 40, wherein the bearer update request signalling includes the power-saving parameter.

After the new mobility management unit 20 transmits the power-saving parameter to the SGW 40, the SGW 40 is further configured to control signalling transmission according to the power-saving parameter:

when there is data needed to be transmitted to the terminal, the SGW 40 transmits the downlink data notification signalling to the new mobility management unit 20 if within the activation time of the terminal currently; the SGW 40 buffers the data of the terminal if within the non-activation time of the terminal currently, and does not transmit the downlink data notification signalling to the new mobility management unit 20 until the activation time of the terminal comes.

The above are only the preferred embodiments of the disclosure and are not intended to limit the scope of protection of the claims of the disclosure.

What is claimed is:

1. A method for controlling signalling transmission in a power-saving mode, comprising:

transmitting, by a terminal, a tracking area update (TAU) request signalling or a routing area update (RAU) request signalling to a new mobility management unit, wherein the TAU request signalling and the RAU request signalling each comprises a power-saving parameter; and transmitting, by the new mobility management unit, the power-saving parameter to an old mobility management unit or a serving gateway;

wherein transmitting the power-saving parameter by the new mobility management unit to the old mobility management unit comprises:

transmitting, by the new mobility management unit, a context request signalling to the old mobility management unit;

transmitting, by the old mobility management unit, a context response signalling to the new mobility management unit, wherein the context response signalling comprises an Idle mode Signalling Reduction (ISR) mode supported indication; and transmitting, by the new mobility management unit, a context confirmation signalling to the old mobility management unit, wherein the context confirmation signalling comprises an ISR activation indication and the power-saving parameter.

2. The method for controlling signalling transmission in a power-saving mode according to claim 1, after the new mobility management unit transmits the power-saving parameter to the old mobility management unit, the method further comprising:

when the serving gateway transmits a notification signalling to the new mobility management unit and the old mobility management unit, determining, by the new mobility management unit and the old mobility management unit according to the power-saving parameter of the terminal, that:

the new mobility management unit and the old mobility management unit transmit a paging message to the terminal if current time is within activation time of the terminal; and the new mobility management unit and the old mobility management unit transmit a feedback signalling to the serving gateway if current time is within non-activation time of the terminal, wherein the feedback signalling comprises a delay indication.

3. The method for controlling signalling transmission in a power-saving mode according to claim 2, wherein the power-saving parameter comprises the activation time and a power-saving mode cycle, or comprises the activation time and sleep time.

4. The method for controlling signalling transmission in a power-saving mode according to claim 1, wherein transmitting the power-saving parameter by the new mobility management unit to the serving gateway comprises:

transmitting, by the new mobility management unit, a bearer update request signalling to the serving gateway, wherein the bearer update request signalling comprises the power-saving parameter.

5. The method for controlling signalling transmission in a power-saving mode according to claim 4, after the new mobility management unit transmits the power-saving parameter to the serving gateway, the method further comprising:

controlling signalling transmission by the serving gateway according to the power-saving parameter:
when there is data needed to be transmitted to the terminal, transmitting a downlink data notification signalling by the serving gateway to the new mobility management unit if current time is within activation time of the terminal; buffering data of the terminal by the serving gateway if current time is within non-activation time of the terminal, and not transmitting a downlink data notification signalling to the new mobility management unit until the activation time of the terminal comes.

6. The method for controlling signalling transmission in a power-saving mode according to claim 5, wherein the power-saving parameter comprises the activation time and a power-saving mode cycle, or comprises the activation time and sleep time.

7. The method for controlling signalling transmission in a power-saving mode according to claim 4, wherein the power-saving parameter comprises activation time and a power-saving mode cycle, or comprises activation time and sleep time.

8. The method for controlling signalling transmission in a power-saving mode according to claim 1 wherein the power-saving parameter comprises activation time and a power-saving mode cycle, or comprises activation time and sleep time.

9. A system for controlling signalling transmission in a power-saving mode, comprising a terminal, a new mobility management unit, an old mobility management unit and a serving gateway, wherein
the terminal is configured to transmit a tracking area update (TAU) request signalling or routing area update (RAU) request signalling to the new mobility management unit, wherein the TAU request signalling and the RAU request signalling each comprises a power-saving parameter;
the new mobility management unit is configured to transmit the power-saving parameter to the old mobility management unit or the serving gateway; and
the old mobility management unit and the serving gateway save the power-saving parameter received;
wherein
the new mobility management unit is also configured to transmit a context request signalling to the old mobility management unit;
the old mobility management unit is also configured to transmit a context response signalling to the new mobility management unit, wherein the context response signalling comprises an Idle mode Signalling Reduction (ISR) mode supported indication; and
the new mobility management unit is also configured to transmit a context confirmation signalling to the old mobility management unit, wherein the context confirmation signalling comprises an ISR activation indication and the power-saving parameter.

10. The system for controlling signalling transmission in a power-saving mode according to claim 9, wherein after the new mobility management unit transmits the power-saving parameter to the old mobility management unit, the new and old mobility management units are also configured to, when the serving gateway transmits a notification signalling to the new mobility management unit and the old mobility management unit, determine, according to the power-saving parameter of the terminal, that:
the new mobility management unit and the old mobility management unit transmit a paging message to the terminal if current time is within activation time of the terminal; and
the new mobility management unit and the old mobility management unit transmit a feedback signalling to the serving gateway if current time is within non-activation time of the terminal, wherein the feedback signalling comprises a delay indication.

11. The system for controlling signalling transmission in a power-saving mode according to claim 10, wherein the power-saving parameter comprises the activation time and a power-saving mode cycle, or comprises the activation time and sleep time.

12. The system for controlling signalling transmission in a power-saving mode according to claim 9, wherein the new mobility management unit is also configured to transmit a bearer update request signalling to the serving gateway, wherein the bearer update request signalling comprises the power-saving parameter.

13. The system for controlling signalling transmission in a power-saving mode according to claim 12, wherein after the new mobility management unit transmits the power-saving parameter to the serving gateway, the serving gateway is also configured to control signalling transmission according to the power-saving parameter:
when there is data needed to be transmitted to the terminal, the serving gateway transmits a downlink data notification signalling to the new mobility management unit if current time is within activation time of the terminal; the serving gateway buffers data of the terminal if current time is within non-activation time of the terminal, and does not transmit a downlink data notification signalling to the new mobility management unit until the activation time of the terminal comes.

14. The system for controlling signalling transmission in a power-saving mode according to claim 13, wherein the power-saving parameter comprises the activation time and a power-saving mode cycle, or comprises the activation time and sleep time.

15. The system for controlling signalling transmission in a power-saving mode according to claim 9, wherein the power-saving parameter comprises activation time and a power-saving mode cycle, or comprises activation time and sleep time.

16. The system for controlling signalling transmission in a power-saving mode according to claim 12, wherein the power-saving parameter comprises activation time and a power-saving mode cycle, or comprises activation time and sleep time.

* * * * *